United States Patent

Hampton et al.

[11] Patent Number: 5,917,150
[45] Date of Patent: Jun. 29, 1999

[54] MINERAL-INSULATED CABLE TERMINATIONS

[75] Inventors: Leslie E. Hampton, Corning, N.Y.; G. Daniel Lipp, Fort Collins, Colo.; Robert J. Locker, Corning, N.Y.

[73] Assignee: Corning Incorporated, Corning, N.Y.

[21] Appl. No.: 08/869,149

[22] Filed: Jun. 4, 1997

Related U.S. Application Data

[60] Provisional application No. 60/019,983, Jun. 17, 1996, abandoned.

[51] Int. Cl.$^6$ .................................................. H01B 17/26
[52] U.S. Cl. ............. 174/50.56; 174/75 B; 174/152 GM
[58] Field of Search .................................. 174/74 R, 75 B, 174/75 D, 76, 106 R, 50.55, 50.56, 50.61, 152 GM

[56] References Cited

U.S. PATENT DOCUMENTS

| | | |
|---|---|---|
| 2,334,756 | 11/1943 | Eichinger . |
| 3,418,423 | 12/1968 | Bronnes et al. ................ 174/152 GM |
| 3,515,950 | 6/1970 | Koons et al. ............................ 317/320 |
| 3,839,623 | 10/1974 | Portmann . |
| 4,140,613 | 2/1979 | Inoue et al. ................ 174/152 GM X |
| 4,313,247 | 2/1982 | Stuttard . |
| 4,349,692 | 9/1982 | Davis et al. ...................... 174/50.61 X |
| 4,493,378 | 1/1985 | Kyle ................................ 174/152 GM |
| 4,866,840 | 9/1989 | Despinoy et al. . |
| 4,934,831 | 6/1990 | Volbrecht . |
| 5,111,002 | 5/1992 | Hollander . |
| 5,149,916 | 9/1992 | Baker et al. . |
| 5,175,067 | 12/1992 | Taylor et al. ..................... 174/50.61 X |
| 5,221,709 | 6/1993 | Irving et al. . |
| 5,223,672 | 6/1993 | Pinneo et al. ................ 174/152 GM X |
| 5,227,587 | 7/1993 | Paterek ............................ 174/152 GM |
| 5,238,650 | 8/1993 | Sheller et al. . |
| 5,267,684 | 12/1993 | Catheline et al. .......... 174/152 GM X |
| 5,271,906 | 12/1993 | Yuuki et al. . |
| 5,368,220 | 11/1994 | Mizuhara et al. ............... 174/50.61 X |
| 5,536,478 | 7/1996 | Lipp et al. . |

FOREIGN PATENT DOCUMENTS

| | | |
|---|---|---|
| 2 178 606 | 2/1987 | United Kingdom . |
| 2 225 496 | 5/1990 | United Kingdom . |

*Primary Examiner*—Kristine Kincaid
*Assistant Examiner*—Chau N. Nguyen
*Attorney, Agent, or Firm*—Kees van der Sterre

[57] ABSTRACT

A mineral-insulated cable termination offering hermetic sealing of the cable end at temperatures in excess of 300° C. having a metal spacer or extension sealed to the cable sheath which matches the cable conductor in thermal expansion, and a high-expansion, refractory glass, ceramic, or glass-ceramic seal filling the gap between and sealed to each of the spacer and the cable sheath, the termination offering stable protection for the cable insulation under corrosive high-temperature operating conditions.

9 Claims, 1 Drawing Sheet

MINERAL-INSULATED CABLE TERMINATIONS

This application claims the benefit of U.S. Provisional application No. 60/019,983 filed Jun. 17, 1996 now abandoned, entitled "MINERAL-INSULATED CABLE TERMINATIONS" by Leslie E. Hampton, G. Daniel Lipp and Robert J. Locker.

BACKGROUND OF THE INVENTION

The present invention relates to mineral-insulated cable terminations, and more particularly to a terminal design for such a cable which provides a high-temperature, electrically insulating, hermetically sealed termination for protecting the mineral insulation from loss or deterioration in moist, high temperature, physically demanding environments.

Mineral-insulated cables as presently used in the art are high-temperature cable structures typically comprising one or more wire conductors contained within a bendable metal sheath. A mineral filler is disposed in the sheath to maintain separation and electrical isolation between the sheath and the conductors. U.S. Pat. Nos. 2,334,756 and 4,313,247 describe several configurations for such cables, and methods and apparatus for the manufacture thereof The insulation employed in mineral-insulated cables generally consists of a compacted mineral powder or other particulate, such as powdered magnesium oxide (MgO) or powdered aluminum oxide (Al2O3). As particulates, these insulation materials are subject to contamination by liquids and vapors, as well as to physical breakdown under stress or mechanical vibration. For this reason filling, crimping or other measures are often employed to seal mineral-insulated cable terminations against loss or contamination of the insulation in use.

A number of different termination designs for protecting the integrity of these cables have been proposed. U.S. Pat. No. 3,839,623 discloses the use of a ceramic end plug for this purpose, while U.S. Pat. No. 4,943,831 discloses a seal for a mineral-insulated thermocouple or thermistor which uses a crimped Teflon® polymer or mica plug to contain the insulation. U.S. Pat. Nos. 4,866,840, 5,149,916 and 5,221,709 disclose sealing structures comprising organic materials for relatively low temperature service.

A recent application for mineral-insulated cables is in the automotive field, where such cables have been proposed for use as power leads for supplying electrical energy to exhaust gas preheaters. Such preheaters, employed in the art as components of electrically heated catalytic converters, are used to preheat cold exhaust gas in order to accelerate the light-off of the catalysts which are used to remove carbon dioxide, hydrocarbons, and nitrogen oxide from the exhaust. Examples of converters of this type are disclosed in U.S. Pat. Nos. 5,238,650 and 5,271,906; co-pending U.S. patent application Ser. No. 08/347,723 entitled "Electrical Leads for a Fluid Heater", filed Dec. 1, 1994 by G. D. Lipp et. al. and commonly assigned herewith, discloses the use of mineral-insulated cables to replace the stud power leads of the earlier converter designs.

As disclosed in the aforementioned co-pending patent application, exhaust gases passing through an electrically heated catalytic converter may reach temperatures in the range of 800°–1000° C. in the course of engine operation. Heat from these gases is readily transmitted from the heater core through the electrical lead and power feedthrough to the electrical terminal outside of the heater enclosure. The mineral-insulated cables described in the copending patent application are effective to significantly reduce electrical terminal temperatures. Unfortunately, however, unless adequately sealed, the mineral insulation within the cables is subject to erosion and/or contamination through exposure to the moist, hot exhaust gases.

Durable mechanical sealing of the terminations of these cables is particularly difficult in the vibrationally severe environment of an automotive exhaust system. Both vibration and the extreme thermal cycling of the cable termination (from below-freezing temperatures to as high as 1000° C.) place demands on the termination seal which cannot be met by conventional sealing materials or designs. In particular, known seals cannot provide the terminal durability necessary to provide the 50,000–100,000 mile service life presently required of automotive engine emissions control equipment.

Among the difficulties giving rise to present limitations on seal integrity are the differences in thermal and chemical properties between the metals used for cable sheathing and cable conductors. These differences give rise to a fundamental bonding incompatibility between the metals, such that refractory sealing materials customarily used for forming high-temperature-capable hermetic seals can form acceptable seals with one or the other of the metals, but not with both.

It is therefore a principal object of the present invention to provide a seal design, and a sealed termination for a mineral-insulated cable, which offer substantial improvements in the physical integrity and resistance to gas penetration of the seal.

It is a further object of the invention to provide a method for terminating a mineral-insulated cable lead which provides a hermetic seal against insulation loss or the contamination of the insulation by liquids or gases present in the surrounding environment.

Other objects and advantages of the invention will become apparent from the following description.

SUMMARY OF THE INVENTION

The cable termination of the invention offers a permanent hermetic seal against gas and moisture intrusion, and a refractory closure which will operate dependably at very high temperatures and through repeated cycling to and from those temperatures. The cable termination is also mechanically durable, being able to survive in a high vibration environment for prolonged periods without loss of seal integrity.

The cable termination of the invention is not limited in its application to any particular cable design. It can provide a refractory, hermetically sealed termination between a metal cable sheath and a metal conductor or group of conductors of almost any available composition or configuration.

As is conventional, the sheath and conductor(s) of a cable to be terminated according to the invention will generally be formed of different metals, each being selected for optimal cable performance rather than for compatibility with the other. Thus the sheath will be formed of a first metal having a first coefficient of thermal expansion, typically selected for ductility and corrosion resistance, while each cable conductor will be formed of a second metal having a second coefficient of thermal expansion, the second metal being selected for appropriate electrical conductivity and the second thermal expansion coefficient differing from the first. As is also conventional, each cable conductor will be spaced a predetermined distance from the metal cable sheath, a distance maintained by the mineral insulation contained within the sheath.

In accordance with the invention, to provide a durable seal to contain the insulation and fill the gap between each conductor and sheath, a metal spacer is first hermetically attached to the sheath. That spacer is formed of a metal having a coefficient of thermal expansion substantially equivalent to the second coefficient of thermal expansion, i.e., to the thermal expansion of the conductors, rather than to the expansion of the sheath.

Depending upon the electrical requirements of the seal, the spacer may bridge more or less of the space between the sheath and conductor. Electrical isolation is then maintained by a remaining gap between the conductors and the spacer. To bridge this gap and provide the hermetic seal required, an impervious ceramic sealing member is provided between the metal spacer and the conductor(s). That sealing member is hermetically sealed to both the metal spacer and to the cable conductor(s), these being of identical or compatible composition and thus being more dependably and permanently connected by a single compatible sealing composition.

For purposes of the present description, all references to the coefficients of thermal expansion of the metal and ceramic components of the cable termination are references to the average thermal expansion coefficients of those materials. As is well known in these art, such coefficients are average linear coefficients of thermal expansion, reported in units of length per unit length per ° C., as calculated from length changes occurring in measure samples of each of the materials over a stated temperature range. For the metal components of the cable terminations the temperature range is typically 25°–500° C., while for the ceramic sealing materials the values are typically calculated over the range 25°–800° C.

The invention also includes a method for terminating a mineral-insulated cable. That method comprises, after first exposing a portion of the cable conductor or conductors, hermetically attaching a metal spacer to the cable sheath. The metal spacer selected for attachment will be formed of a metal having a coefficient of thermal expansion substantially equivalent to that of the cable conductor or conductors. Hermetic sealing of the spacer to the sheath is by means of a suitable metal joining method such as soldering, brazing or welding.

A quantity of a ceramic sealing material is next provided in the gap between the metal spacer and the cable conductor (s), and the cable end including at least the sealing material, spacer and conductor or conductors is heated to obtain bonding of the ceramic sealing material to the conductors and spacer. Heating of these components is at a temperature at least sufficient to soften the ceramic sealing material and thereby form a hermetic bond between that material and the adjacent metal parts. After cooling, the sealed cable termination comprising the spacer and ceramic sealing material is found to provide a gas-tight or hermetic seal, together with a high degree of mechanical and thermal durability even under extreme conditions of vibration and high-temperature thermal cycling.

DESCRIPTION OF THE DRAWINGS

The invention may be further understood by reference to the drawings, wherein.

DETAILED DESCRIPTION

Figure 1:
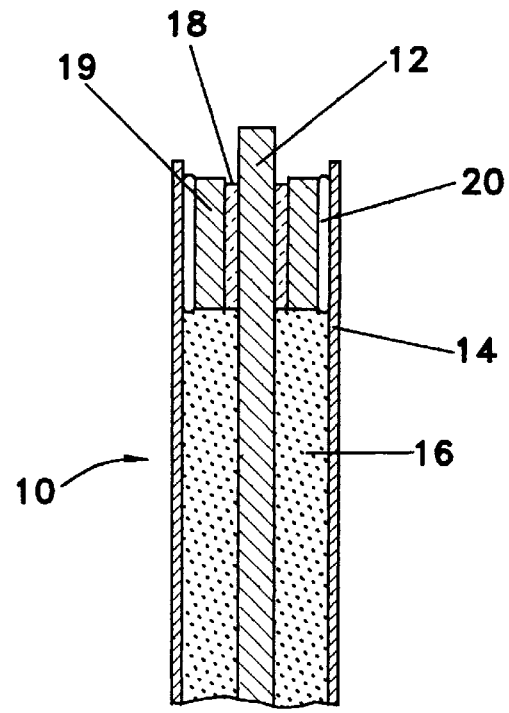
FIG. 1 schematically illustrates a first embodiment of a sealed mineral-insulated cable termination according to the invention.

The use of mineral-insulated cable leads for the supply of electrical power for automotive exhaust treatment applications places unusual thermal and mechanical demands on the cable terminations. Since the seal designs and methods of the present invention are particularly applicable to such applications, the following description of preferred embodiments will refer particularly to exhaust heaters for catalytic exhaust treatment even though the invention is not limited thereto.

To achieve the mechanical durability needed in automotive exhaust environments, metal stud-and-bushing designs such as disclosed in U.S. Pat. Nos. 5,271,906 and 5,238,650 were first developed. The initial goal of the development was simply to provide a mechanically durable gas-tight electrical power feed-through; unfortunately, extremely high electrical terminal temperatures remained a problem.

The use of mineral-insulated cable power leads offers greater flexibility of lead placement, as well as a much more favorable temperature drop from the heater side to the electrical power side of the connection. One difficulty, however, is that the engine exhaust environment in which the cable must be used generates considerable moisture through condensation. This moisture can adversely effect the electrical properties of a mineral insulation such as MgO, which is highly hygroscopic and very likely to lose dielectric strength if moisture is present.

The objective of the present invention is to provide an hermetic seal at the termination of the cable to prevent moisture migration into the MgO or other insulator. Among the properties which must be demonstrated by this seal are a high use temperature, i.e., an operating temperature capability of at least 300° C. and preferably at least 500° C., an electrical resistance of 1 megohm at operating temperatures, and hermetic (gas-tight) sealing to conductor and sheathing metals even though these metals may differ significantly in chemical bonding and thermal expansion characteristics.

One approach which has been attempted to provide the required seal is that of forming a direct hermetic seal between the central conductor or conductors and the metal sheath using a sealing glass or glass-ceramic to protect the mineral insulation from loss or damage. In a typical design of this type, the conductor will typically consist of nickel, while the sheath will consist of Type 304 stainless steel and the insulation of MgO. The coefficient of thermal expansion of the nickel conductor is about $153 \times 10^{-7}/°$ C., and that of the stainless steel sheath about $172 \times 10^{-7}/°$ C.

In this approach one refractory ceramic sealing material used to form the hermetic seal has consisted of a leucite ($K_2O \cdot Al_2O_3 \cdot 4SiO_2$) glass-ceramic having a composition, in weight percent on the oxide basis, of about 60% $SiO_2$, 13% $Al_2O_3$, 15% $K_2O$ 2% $B_2O_3$, 3% CaO, 3% SrO, 1% MgO, 2% $Cs_2O$, and 1% $WO_3$. This glass-ceramic composition was selected to provide a thermal expansion coefficient after crystallization of about $169 \times 10^{-7}/°$ C., to approximate the expansion of the stainless steel sheath. It was provided in the form of a glass powder which was used to fill the gap between the conductor and sheath, and then fired to convert the glass to a leucite glass-ceramic.

Unfortunately, this sealing approach met with only limited success. The seal manifested some evidence of microcracking, an effect which would eventually permit moisture intrusion around the seal and into the cable insulation. This loss of seal integrity is currently attributed to factors such as the relatively large distance between the conductor and sheath, the shrinkage which occurred during curing of the seal, and the relatively large difference in expansion coefficient between the conductor and sheath.

FIG. 1 of the drawing is a schematic illustration of a first embodiment of a seal provided in accordance with the invention. As shown in FIG. 1, a seal between a nickel conductor 12 and a 304 SS sheath 14 is provided by a combination of a refractory ceramic sealing member 18 and a metal spacer 19.

Composed of nickel and thus matching conductor 12 in both thermal expansion and chemical bonding characteristics, spacer 19 extends from sheath 14 toward nickel conductor 12 to partially bridge the conductor-sheath gap filled by MgO insulation material 16. As generally shown in FIG. 1, metal spacers useful in the construction of these seals will most typically be of cylindrical, ring or perforated disk configuration, and will incorporate at least one circumferential end or side surface sized and configured to contact the entire periphery of a circumferential inner, outer, or end surface of the sheath end portion of the cable to be terminated.

To form a hermetic seal between steel sheath 14 and nickel spacer 19, the spacer may be welded or brazed to the sheath by means of brazed joint 20. This brazed metal-to-metal attachment will be both hermetic and mechanically durable despite the difference in properties between the metals, because of its inherent ductility.

To bridge the remaining gap between nickel spacer 19 and nickel conductor 12, a refractory ceramic sealing material 18 consisting of a leucite glass-ceramic may be selected. A suitable glass-ceramic consists, in weight percent on the oxide basis, of about 60% $SiO_2$, 13% $Al_2O_3$, 15% $K_2O$, 2% $B_2O_3$, 3% SrO, 3% BaO, 1% MgO, 2% $Cs_2O$, and 1% TiO2, and is introduced into the gap between the spacer and the conductor as a glass powder.

Formulated to provide a thermal expansion of about $154 \times 10^{-7}/°$ C. after firing, approximating the expansion of the nickel spacer and nickel conductor, this glass-ceramic will provide a hermetic seal which is both mechanically durable and gas-tight. Thus the high refractoriness, chemical compatibility, and close expansion match of this sealing material with the metal components of the cable are expected to insure retention of mechanical integrity and gas-tight sealing even after extensive thermal cycling between ambient temperatures and typical catalytic converter operating temperatures. Further, the electrical resistivity and dielectric strength of the glass-ceramic sealing material should easily meet current requirements for electrical isolation between the conductor and the steel sheath for this type of application.

Figure 2:
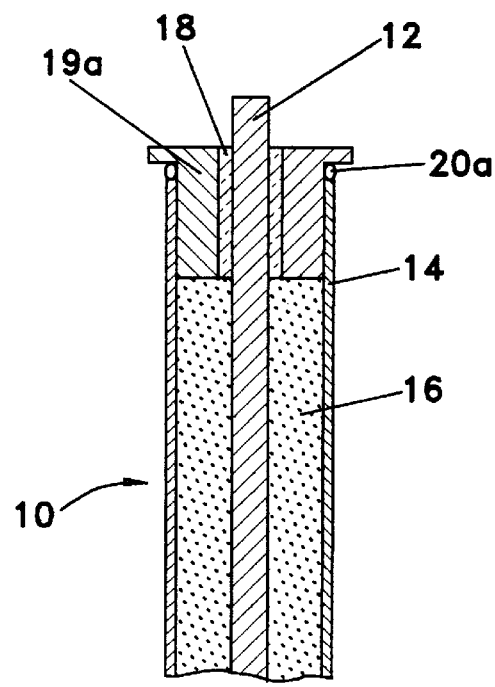
FIG. 2 schematically illustrates a second embodiment of a sealed mineral-insulated cable termination according to the invention.

An alternative construction for a mineral-insulated cable termination is schematically illustrated in FIG. 2 of the drawing. In that design, hermetic sealing of MgO insulation 16 against moisture intrusion is achieved using a nickel spacer 19a which has a circumferentially outwardly extending shoulder resting on the edge of sheath 14. A small continuous circumferential bead weld 20a is sufficient to hermetically seal spacer 19a to sheath 14, while glass-ceramic sealing material 18 then completes the hermetic seal between the inner face of nickel spacer 19a and nickel cable conductor 12.

Figure 3:
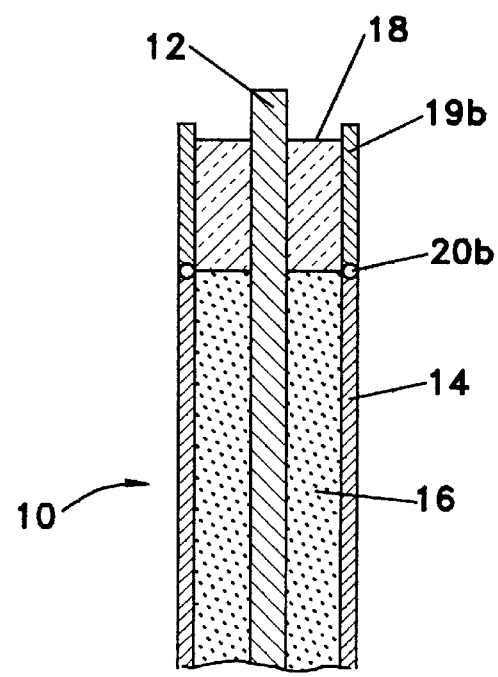
FIG. 3 schematically illustrates a third embodiment of a sealed mineral-insulated cable termination according to the invention.

Yet another alternative construction for a mineral-insulated cable termination is schematically illustrated in FIG. 3 of the drawing. In that design, hermetic sealing of MgO insulation 16 against moisture intrusion is achieved using a nickel sheath extender 19b which rests on the edge of sheath 14 and is welded or brazed thereto. A small continuous circumferential bead weld 20a is sufficient to hermetically seal extender 19b to sheath 14, while glass-ceramic sealing material 18 then completes the hermetic seal between the inner face of extender 19b and nickel cable conductor 12.

The sealing method of the invention is useful for terminating a relatively wide variety of mineral-insulated cables, both of single conductor and multiple conductor designs. A variety of sheath and conductor compositions can be accommodated, since ceramic (glass, ceramic, or glass-ceramic) sealing materials compatible with most of the available metals useful for providing cable conductors (and spacers compatible therewith) are known. In general, the preferred sheath materials will be selected from the group consisting of corrosion-resistant or stainless steels, examples of which include 300-series and 400-series stainless steels such as Type 304 and Type 405 stainless steel. Cable conductors of nickel, nickel alloys, copper, or copper alloys are most useful for catalytic heater applications, preferred examples of these including nickel and nickel 200 alloys. Alternative conductors could be composed of aluminum, stainless steel, or even silver or gold.

Among the sealing materials preferred for use in the invention are high thermal expansion glass-ceramics of alkali aluminosilicate composition, with high-expansion potassium aluminosilicate glass-ceramics comprising leucite as the principal crystalline phase being particularly preferred. Glass-ceramic seals are generally favored since these materials, if properly selected, offer the superior metal bonding characteristics of compatible glasses during the early stages of the sealing heat treatment cycle, while converting to highly crystalline, and therefore refractory and stable, sealing structures at the completion of the sealing cycle.

Depending on the temperature requirements of the seal, refractory sealing glasses or sinterable ceramic compositions may be substituted for high-expansion glass-ceramics if desired. However, glasses offering good stability against devitrification and microcracking at seal operating temperatures of at least about 500° C., or ceramics offering good sintering and metal bonding capabilities at temperatures above such operating temperatures but below the melting temperatures of the metal components of the cable, will normally be preferred.

In selecting the ceramic sealing material to be used to provide the required seal, chemical compatibility between the sealing material and the metal of the conductors and spacer is important. Good chemical compatibility is generally manifested by good wetting of the metal by the softened glass, and the absence of any adverse chemical reactions between the metal and the glass or ceramic at the softening or bonding temperatures employed. Many combinations of glasses and metals exhibiting good bonding compatibility are known, and others can readily be identified by routine experiment.

The initial steps of providing an acceptable hermetic cable termination in accordance with the invention comprise first selecting a metal spacer having a composition and properties closely matching those of the cable conductor, and then hermetically attaching that spacer to the cable sheath. Welding, soldering or brazing constitute the most effective and economical methods for achieving the necessary hermetic sealing of the spacer to the sheath, although alternative sealing processes could be substituted therefor if capable of providing a joint of adequate mechanical and thermal durability.

In general, best results from the standpoint of favorable chemical and thermal compatibility between the spacer and the cable conductors are achieved if the compositions of the metals making up these parts are substantially the same. Significant differences in metal composition, and/or differences in thermal expansion of more than about $5\times10^{-7}/°$ C. between the spacer, the conductors, and the ceramic sealing materials used to form the hermetic seal, are generally to be avoided.

After the seal between the conductor-compatible spacer and cable sheath has been developed, a heat-softenable ceramic sealing material, composed of a selected glass or ceramic sealing composition, is positioned between the conductor and the spacer. The spacer, conductor and ceramic composition are then heated to a temperature at least sufficient to soften the ceramic composition and bond it to the spacer and conductor.

The form of the ceramic material used to provide the sealing material is not critical; it may comprise a green compact of heat fusible glass or ceramic powder (including a thermally crystallizable glass capable of conversion during heat sealing to a highly crystalline glass-ceramic), or it may be a pre-fused but heat-softenable button, ring, or other preform of a glass or ceramic material. In either case, the heating of the sealing material, together with the conductor and spacer, must be to a temperature at least sufficient to soften the ceramic material, in order to achieve wetting of the spacer and conductor for the formation of a satisfactory hermetic seal.

In the case of a thermally crystallizable glass for a glass-ceramic seal, this heating will preferably be continued for a time at least sufficient to substantially complete the crystallization of the glass-ceramic seal. For the preferred potassium aluminosilicate glass-ceramics above described, heating to a temperature in the range of about 1000°–1200° C. for a time in the range of 2–6 hours, most preferably 4 hours, will provide good sealing and effective crystallization of the seal.

Some of the metals currently used as conductors in mineral-insulated cables of the kind encompassed by the invention can exhibit less than optimum bonding with glass, ceramic, or glass-ceramic compositions of the necessary refractoriness and thermal expansion characteristics. This may be due to the unfavorable wetting characteristics of the metals, or even in some cases to undue chemical reactivity between the metals and glasses otherwise suitable for forming the required hermetic seals.

In these instances it can be useful to treat the bonding surfaces of the metal conductors and/or the metal spacers to improve the quality of the hermetic seal. In general, seal-enhancing surface pre-treatments of the kind conventionally used to promote glass/metal bonding in other applications can be used for this purpose. Examples of such treatments include oxidizing or metal-etching pre-treatments, or even the application of compatible coatings such as flame- or plasma-sprayed oxide coatings, e.g., of aluminum oxide or the like.

We claim:

1. A hermetically sealed mineral-insulated cable termination comprising:

a metal cable sheath of a steel having a first coefficient of thermal expansion;

at least one cable conductor of a second metal selected from the group consisting of nickel, nickel alloys, copper, and copper alloys, spaced from the metal cable sheath, the second metal having a second coefficient of thermal expansion differing from the first coefficient of thermal expansion;

a metal spacer hermetically attached to the sheath, the spacer being formed of a metal having a coefficient of thermal expansion substantially equivalent to the second coefficient of thermal expansion and being separated from the cable conductor by a gap; and an impervious ceramic sealing member composed of a crystalline, refractory, high-expansion alkali aluminosilicate glass-ceramic filling the gap and being hermetically sealed to both the spacer and the cable conductor;

whereby the termination exhibits improved service life in vibrationally severe environments under thermal cycling from below-freezing temperatures up to as high as 1000° C.

2. A termination in accordance with claim 1 wherein the metal spacer extends inwardly from the cable sheath toward the cable conductor a distance such that said gap is smaller than the spacing between the sheath and conductor.

3. A termination in accordance with claim 1 wherein the cable sheath is formed of a corrosion resistant metal selected from the group consisting of 300-series and 400-series stainless steels.

4. A termination in accordance with claim 1 wherein the metal spacer is formed of a metal having a composition substantially corresponding to conductive metal of the cable conductor.

5. A termination in accordance with claim 1 wherein the ceramic sealing member has a softening or melting temperature of at least 500° C.

6. A termination in accordance with claim 1 wherein the ceramic sealing member has a coefficient of thermal expansion differing from the second coefficient of thermal expansion by less than $5\times10^{-7}/°$ C.

7. A termination in accordance with claim 1 wherein at least one of the conductor and the spacer have surfaces treated to promote the formation of a hermetic seal.

8. A hermetically sealed mineral-insulated cable termination comprising:

a steel cable sheath containing a compacted mineral powder insulation for containment within the sheath;

at least one cable conductor disposed within the insulation and having a composition selected from the group consisting of nickel, nickel alloys, copper, and copper alloys, the conductor being spaced from the steel cable sheath;

a spacer hermetically brazed, welded or soldered to the sheath, the spacer being formed of a metal selected from the group consisting of nickel, nickel alloys, copper, and copper alloys and having a coefficient of thermal expansion substantially equivalent to the coefficient of thermal expansion of the sheath and being separated from the cable conductor by a gap; and an impervious crystalline ceramic sealing member composed of a high expansion potassium aluminosilicate glass-ceramic filling the gap and being hermetically sealed to both the spacer and the cable conductor.

9. A hermetically sealed mineral-insulated cable termination in accordance with claim 8 wherein at least one of the cable conductor and spacer is composed of surface-etched or surface-oxidized nickel, nickel alloy, copper or copper alloy.

* * * * *